United States Patent
Sun et al.

(10) Patent No.: US 11,452,145 B2
(45) Date of Patent: Sep. 20, 2022

(54) SEQUENCE-BASED RANDOM ACCESS CHANNEL (RACH) OCCASION

(71) Applicant: QUALCOMM Incorporated, San Diego, CA (US)

(72) Inventors: Jing Sun, San Diego, CA (US); Tanumay Datta, Bangalore (IN); Kapil Bhattad, Bangalore (IN); Ananta Narayanan Thyagarajan, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 16/875,462

(22) Filed: May 15, 2020

(65) Prior Publication Data

US 2020/0374943 A1    Nov. 26, 2020

(30) Foreign Application Priority Data

May 22, 2019   (IN) ............................. 201941020287

(51) Int. Cl.
*H04W 74/08* (2009.01)
*H04W 72/04* (2009.01)
*H04W 56/00* (2009.01)

(52) U.S. Cl.
CPC ..... *H04W 74/0841* (2013.01); *H04W 56/001* (2013.01); *H04W 72/0446* (2013.01); *H04W 72/0453* (2013.01)

(58) Field of Classification Search
CPC ......... H04W 74/0833; H04W 74/0841; H04W 72/0446; H04W 72/0453; H04W 56/001
See application file for complete search history.

(56) References Cited

U.S. PATENT DOCUMENTS

2020/0374943 A1* 11/2020 Sun .................. H04W 74/0833
2021/0219352 A1*  7/2021 Einhaus ................. H04J 13/00
(Continued)

OTHER PUBLICATIONS

Ad-Hoc Chair (Ericsson): "Chairman's notes of AI 7.2.2 Study on NR-based Access to Unlicensed Spectrum," 3GPP Draft, 3GPP TSG-RAN WG1 Meeting #97, R1-1907846, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 20, 2019 (May 20, 2019), XP051740119, 8 pages, Retrieved from the Internet: URL: http://www.3gpp.org/ftp/tsg%5Fran/WG1%5FRL1/TSGR1%5F97/Docs/R1%2D1907846%2Ezip [retrieved on May 20, 2019] section 7.2.2.1.1 "Initial access signals/channels".

(Continued)

*Primary Examiner* — Brian D Nguyen
(74) *Attorney, Agent, or Firm* — Harrity & Harrity, LLP \ Qualcomm

(57) ABSTRACT

This disclosure provides systems, methods, and apparatuses for random access channel (RACH) occasions that overlap each other in time and frequency. In one aspect, the RACH occasions may use different preamble sequence sets. A base station may signal configuration information indicating the preamble sequence sets for the RACH occasions and information indicating a time-frequency resource allocation of the RACH occasions. A UE may perform a random access procedure in accordance with the configuration information.

30 Claims, 8 Drawing Sheets

(56) References Cited

U.S. PATENT DOCUMENTS

| | | | | |
|---|---|---|---|---|
| 2021/0337438 | A1* | 10/2021 | Xiong | H04W 36/0077 |
| 2021/0345406 | A1* | 11/2021 | Myung | H04W 24/08 |
| 2021/0345407 | A1* | 11/2021 | Myung | H04W 72/1263 |
| 2021/0351888 | A1* | 11/2021 | Park | H04W 72/042 |
| 2021/0368481 | A1* | 11/2021 | Jo | H04W 72/042 |
| 2021/0378030 | A1* | 12/2021 | Wu | H04W 74/0866 |
| 2021/0378031 | A1* | 12/2021 | Chai | H04W 72/0446 |
| 2022/0078718 | A1* | 3/2022 | Hoshino | H04W 52/10 |

OTHER PUBLICATIONS

Fujitsu: "Consideration on PRACH in NR-U," 3GPP Draft, 3GPP TSG RAN WG1 #97, R1-1906430, Consideration on PRACH in NR-U, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 13, 2019 (May 13, 2019), XP051727880, 4 pages, Retrieved from the Internet: URL: http://www.3gpp.org/ftp/Meetings%5F3GPP%5FSYNC/RAN1/Docs/R1%2D1906430%2Ezip [retrieved on May 13, 2019] the whole document.

International Search Report and Written Opinion—PCT/US2020/033417—ISA/EPO—dated Aug. 26, 2020.

Qualcomm Incorporated: "Feature Lead Summary on Initial Access Signals and Channels for NR-U," 3GPP Draft, 3GPP TSG RAN WG1 Meeting #97, R1-1907883, FL Summary 7.2.2.1.1 V2, 3rd Generation Partnership Project (3GPP), Mobile Competence Centre, 650, Route Des Lucioles, F-06921, Sophia-Antipolis Cedex, France, vol. RAN WG1. No. Reno, USA, May 13, 2019-May 17, 2019, May 17, 2019 (May 17, 2019). XP051740144, 44 pages, Retrieved from the Internet: URL: http://www.3gpp.org/ftp/tsg%5Fran/WG1%5FRL1/TSGR1%5F97/Docs/R1%2D1907883%2Ezip [retrieved on May 17, 2019] section 1 "Introduction" section 2.2 "PRACH".

* cited by examiner

SEQUENCE-BASED RANDOM ACCESS CHANNEL (RACH) OCCASION

CROSS-REFERENCE TO RELATED APPLICATION

This Patent application claims priority to Indian Patent Application No. 201941020287, filed on May 22, 2019, entitled "SEQUENCE-BASED RANDOM ACCESS CHANNEL (RACH) OCCASION," and assigned to the assignee hereof. The disclosure of the prior application is considered part of and is incorporated by reference in this Patent application.

TECHNICAL FIELD

Aspects of the present disclosure relate generally to wireless communication, and more particularly, to techniques for a sequence-based random access channel (RACH) occasion.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving configuration information associated with two or more random access channel (RACH) occasions, where the configuration information indicates preamble sequence sets for the two or more RACH occasions, where each of the two or more RACH occasions is associated with a respective preamble sequence set; selecting a RACH occasion, of the two or more RACH occasions; and transmitting a RACH preamble on the selected RACH occasion in accordance with the preamble sequence set associated with the RACH occasion.

In some implementations, the RACH preamble occupies a threshold channel bandwidth of a channel in accordance with an occupied channel bandwidth requirement of the UE.

In some implementations, each RACH occasion of the two or more RACH occasions is associated with a same time-frequency resource allocation.

In some implementations, the two or more RACH occasions are associated with respective time-frequency resource allocations.

In some implementations, the method may include receiving a synchronization signal block (SSB) that identifies a particular time-frequency resource allocation of the respective time-frequency resource allocations, where transmitting the RACH preamble on the selected RACH occasion is based on the selected RACH occasion being associated with the particular time-frequency resource allocation.

In some implementations, the configuration information identifies a first preamble sequence set for a first RACH occasion of the two or more RACH occasions, where preamble sequence sets for one or more other RACH occasions, of the two or more RACH occasions, are derived based on the first preamble sequence set.

In some implementations, the configuration information identifies a first preamble sequence set for a first RACH occasion of the two or more RACH occasions, where a second preamble sequence set for a second RACH occasion of the two or more RACH occasions starts at a last-used root and a next sequence after a last-used sequence of the first preamble sequence set.

In some implementations, the configuration information identifies a first preamble sequence set for a first RACH occasion, of the two or more RACH occasions, where a second preamble sequence set for a second RACH occasion of the two or more RACH occasions starts at a next root after a last-used root of the first preamble sequence set.

In some implementations, the configuration information identifies respective root sequences for the respective preamble sequence sets.

In some implementations, the configuration information indicates a number of RACH occasions associated with a particular time-frequency resource allocation.

Another innovative aspect of the subject matter described in this disclosure can be implemented in an apparatus of a UE for wireless communication. The apparatus may include a first interface configured to obtain configuration information associated with two or more RACH occasions, where the configuration information indicates preamble sequence sets for the two or more RACH occasions, where each of the two or more RACH occasions is associated with a respective preamble sequence set; a processing system configured to select a RACH occasion, of the two or more RACH occasions; and a second interface configured to output a RACH preamble for transmission on the selected RACH occasion in accordance with the preamble sequence set associated with the RACH occasion.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive configuration information associated with two or more RACH occasions, where the configuration information indicates preamble sequence sets for the two or more RACH occasions, where each of the two or more RACH occasions is associated with a respective preamble sequence set; select a RACH occasion, of the two or more RACH occasions; and transmit a RACH preamble on the selected RACH occasion in accordance with the preamble sequence set associated with the RACH occasion.

Another innovative aspect of the subject matter described in this disclosure can be implemented in an apparatus for wireless communication. The apparatus may include means for receiving configuration information associated with two or more RACH occasions, where the configuration information indicates preamble sequence sets for the two or more RACH occasions, where each of the two or more RACH occasions is associated with a respective preamble sequence set; means for selecting a RACH occasion, of the two or more RACH occasions; and means for transmitting a RACH preamble on the selected RACH occasion in accordance with the preamble sequence set associated with the RACH occasion. In some implementations, the apparatus may include means for receiving a synchronization signal block that identifies a particular time-frequency resource allocation of the respective time-frequency resource allocations.

Another innovative aspect of the subject matter described in this disclosure can be implemented in a method of wireless communication performed by an apparatus of a base station (BS). The method may include transmitting configuration information associated with two or more RACH occasions, where the configuration information indicates preamble sequence sets for the two or more RACH occasions, where each of the two or more RACH occasions is associated with a respective preamble sequence set; and receiving a RACH preamble on a selected RACH occasion, of the two or more RACH occasions, in accordance with the preamble sequence set associated with the RACH occasion.

In some implementations, the RACH preamble occupies a threshold channel bandwidth of a channel in accordance with an occupied channel bandwidth requirement of the UE.

In some implementations, the two or more RACH occasions are associated with respective time-frequency resource allocations.

In some implementations, the method may include transmitting an SSB that identifies a particular time-frequency resource allocation of the respective time-frequency resource allocations, where receiving the RACH preamble on the selected RACH occasion is based on the selected RACH occasion being associated with the particular time-frequency resource allocation.

In some implementations, the configuration information identifies a first preamble sequence set for a first RACH occasion of the two or more RACH occasions, where preamble sequence sets for one or more other RACH occasions, of the two or more RACH occasions, are derived based on the first preamble sequence set.

In some implementations, the configuration information identifies a first preamble sequence set for a first RACH occasion of the two or more RACH occasions, where a second preamble sequence set for a second RACH occasion of the two or more RACH occasions starts at a last-used root and a next sequence after a last-used sequence of the first preamble sequence set.

In some implementations, the configuration information identifies a first preamble sequence set for a first RACH occasion, of the two or more RACH occasions, where a second preamble sequence set for a second RACH occasion of the two or more RACH occasions starts at a next root after a last-used root of the first preamble sequence set.

In some implementations, the configuration information identifies respective root sequences for the respective preamble sequence sets.

In some implementations, the configuration information indicates a number of RACH occasions associated with a particular time-frequency resource allocation.

Another innovative aspect of the subject matter described in this disclosure can be implemented in an apparatus of a BS for wireless communication. The apparatus may include memory and one or more processors operatively coupled to the memory. The memory and the one or more processors may be configured to transmit configuration information associated with two or more RACH occasions, where the configuration information indicates preamble sequence sets for the two or more RACH occasions, where each of the two or more RACH occasions is associated with a respective preamble sequence set; and receive a RACH preamble on a selected RACH occasion, of the two or more RACH occasions, in accordance with the preamble sequence set associated with the RACH occasion.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to transmit configuration information associated with two or more RACH occasions, where the configuration information indicates preamble sequence sets for the two or more RACH occasions, where each of the two or more RACH occasions is associated with a respective preamble sequence set; and receive a RACH preamble on a selected RACH occasion, of the two or more RACH occasions, in accordance with the preamble sequence set associated with the RACH occasion.

Another innovative aspect of the subject matter described in this disclosure can be implemented in an apparatus for wireless communication. The apparatus may include means for transmitting configuration information associated with two or more RACH occasions, where the configuration information indicates preamble sequence sets for the two or more respective occasions, where each of the two or more RACH occasions is associated with a respective preamble sequence set; and means for receiving a RACH preamble on a selected RACH occasion, of the two or more RACH occasions, in accordance with the preamble sequence set associated with the RACH occasion. In some implementations, the apparatus may include means for transmitting a synchronization signal block that identifies a particular time-frequency resource allocation of the respective time-frequency resource allocations. Such means may include one or more components described elsewhere herein.

Aspects generally include a method, apparatus, system, computer program product, non-transitory computer-readable medium, user equipment, base station, wireless communication device, and processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
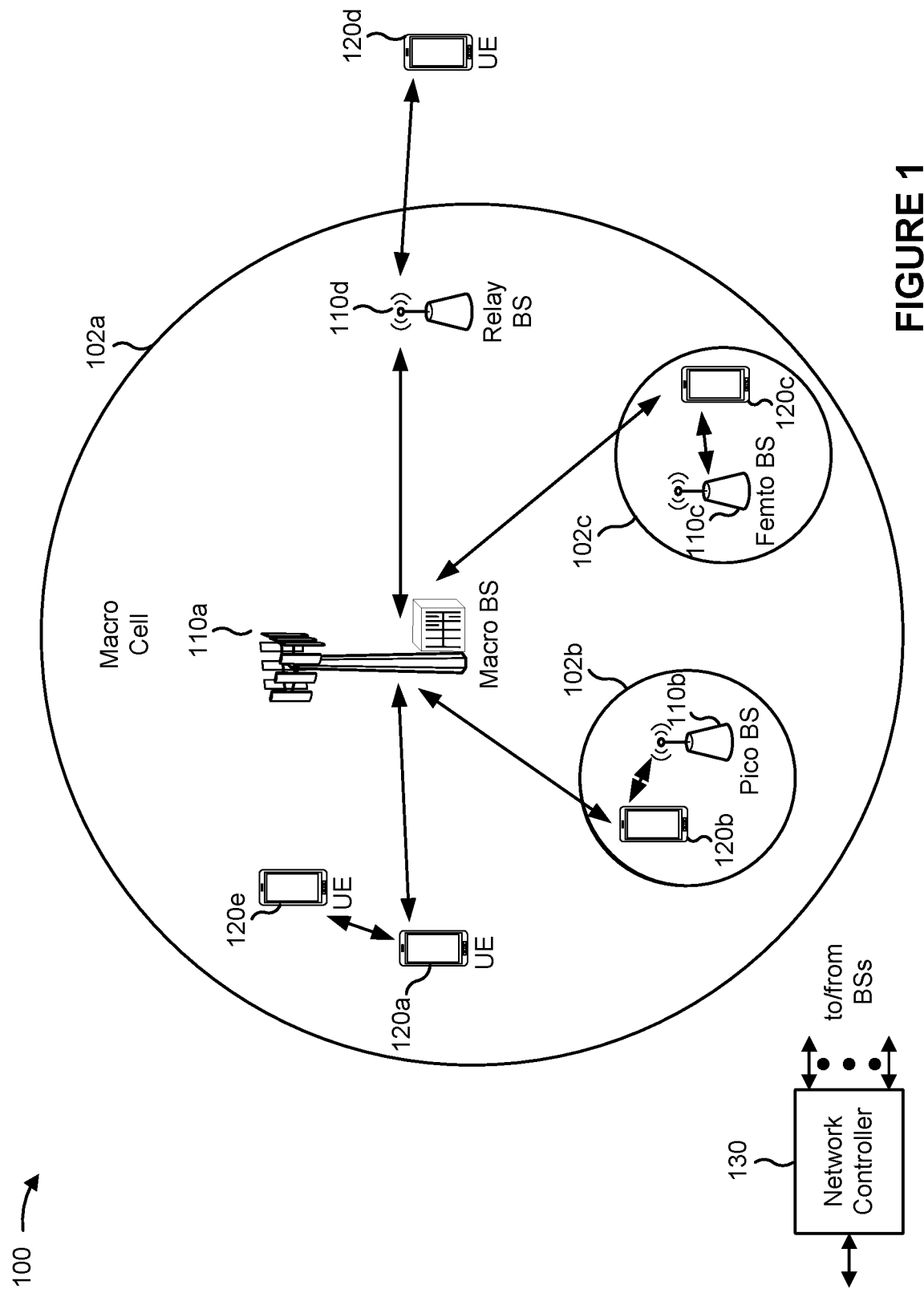
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) may access a network provided by a base station (BS) using a random access channel (RACH) procedure. For example, the UE may transmit a RACH preamble on a selected RACH occasion to trigger a RACH procedure. In some cases, multiple RACH occasions may be frequency division multiplexed, which may improve spectral efficiency and increase the number of UEs that can transmit RACH preambles without colliding with each other. For example, a synchronization signal block (SSB) transmitted by a base station may map to multiple RACH occasions in the frequency domain, and a UE that receives the SSB may select one of the RACH occasions on which to transmit a RACH preamble. However, for some radio access technologies (RATs), such as NR-unlicensed (NR-U), occupied channel bandwidth (OCB) requirements may necessitate the occupation of a threshold percentage of the available bandwidth of a band (such as, for example, approximately 60 percent, 65 percent, 70 percent, 75 percent, 80 percent, 85 percent, etc.). In such instances, a longer RACH preamble may be used. For example, the longer RACH preamble may be longer than a baseline RACH preamble length, which may satisfy the OCB requirement, improve maximum coupling loss (MCL) performance, and increase capacity. However, frequency division multiplexing may be impractical when the longer RACH preamble is used due to the increased size of the RACH message.

Some techniques and apparatuses described herein provide RACH occasions that overlap in frequency. For example, a set of RACH occasions may be associated with the same time-frequency resources or a same RACH occasion. A set of RACH occasions associated with the same time-frequency resources or the same RACH occasion may be referred to as virtual RACH occasions. Each RACH occasion of the set of RACH occasions may be associated with a different set of RACH preambles. An SSB may identify a particular time-frequency resource, and a UE that receives the SSB may select one of the RACH occasions associated with the particular time-frequency resource. The UE may transmit a RACH preamble associated with the selected RACH occasion.

Particular implementations of the subject matter described in this disclosure can be implemented to realize one or more of the following potential advantages. Random access capacity of certain bands (such as NR-U bands or other bands with OCB requirements) may be increased, thereby increasing capacity of such bands and potentially reducing delay associated with initial access. Furthermore, the OCB requirements of such bands may be satisfied by the usage of longer RACH sequences without sacrificing random access capacity as would occur without the usage of virtual RACH occasions.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) where pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
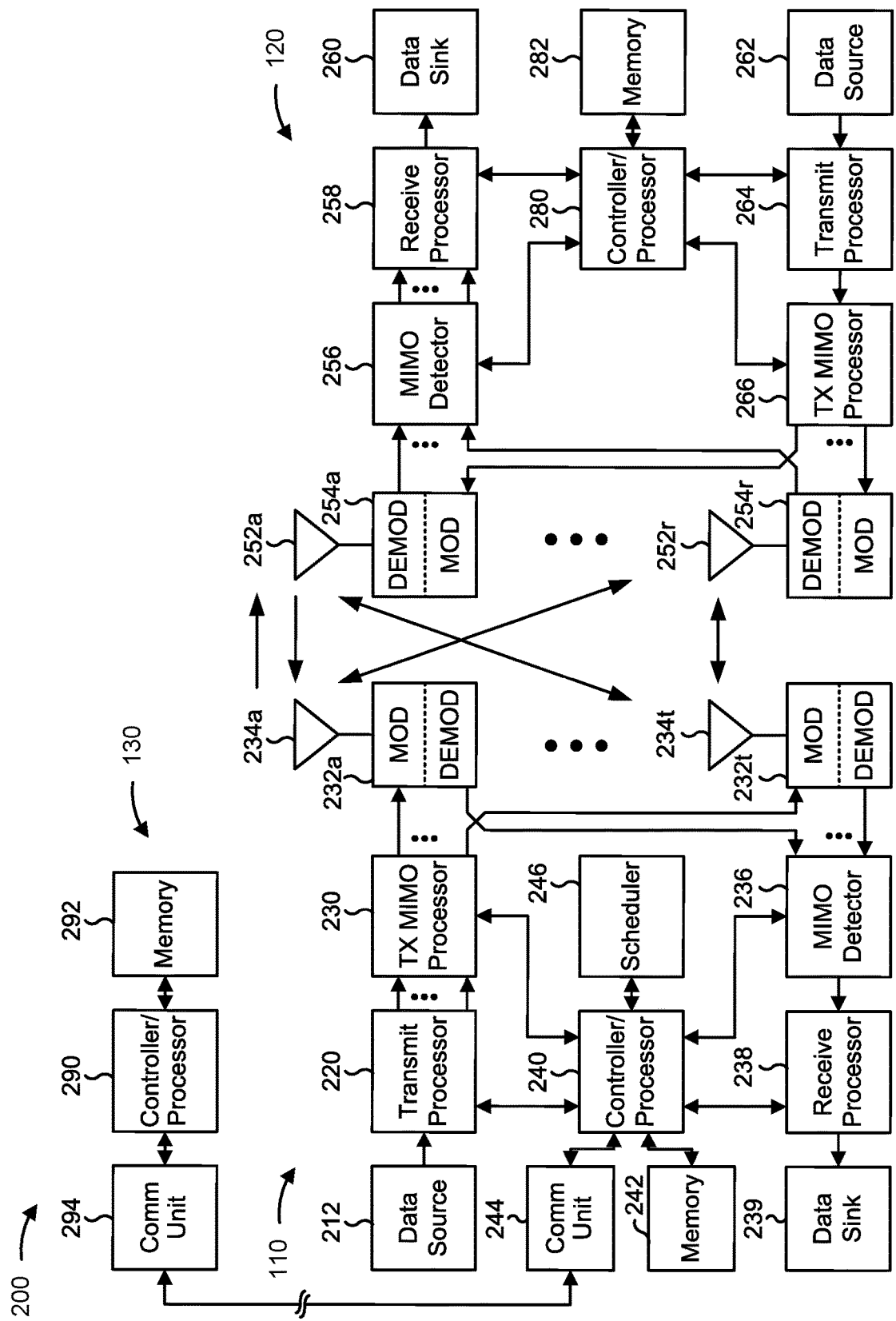
FIG. 2 is a block diagram conceptually illustrating an example of a base station in communication with a UE in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to receive or obtain information, and a second interface configured to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with a random access procedure using random access channel occasions that are associated with a same time-frequency resource allocation, as described in more detail elsewhere herein. For example, the controller/processor 240 of base station 110, the controller/processor 280 of UE 120, or any other component(s) (or combinations of components) of FIG. 2 may perform or direct operations of, for example, the process 500 of FIG. 5, or other processes as described herein. The memories 242 and 282 may store data and program codes for base station 110 and UE 120, respectively. A scheduler 246 may schedule UEs for data transmission on the downlink, the uplink, or a combination thereof.

Figure 4:
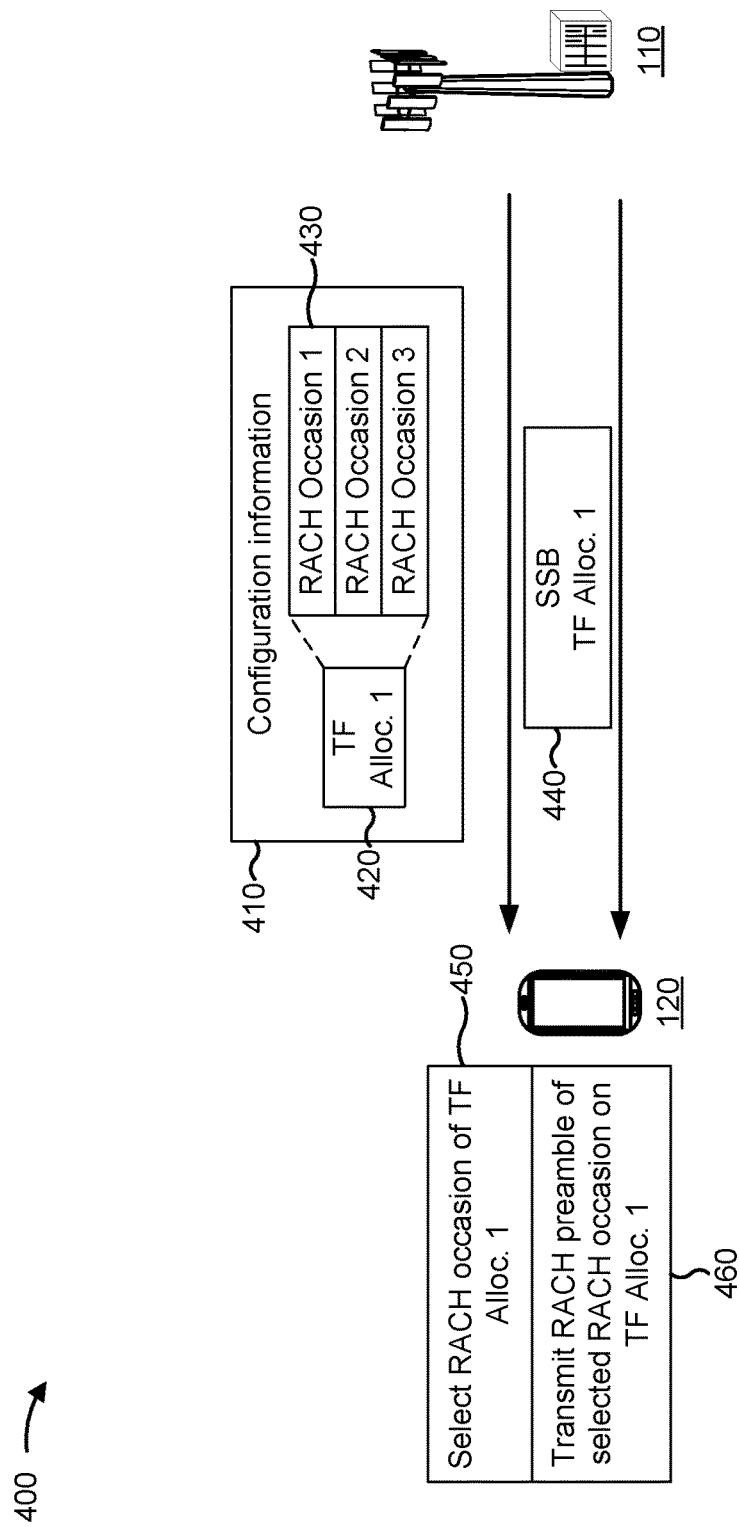
FIG. 4 is a diagram illustrating an example of a random access procedure using random access channel (RACH) occasions that are associated with a same time-frequency resource allocation.

The stored program codes, when executed by the controller/processor 280 or other processors and modules at UE 120, may cause the UE 120 to perform operations described with respect to the process 400 of FIG. 4, or other processes as described herein. The stored program codes, when executed by the controller/processor 240 or other processors and modules at base station 110, may cause the base station 110 to perform operations described with respect to the process 600 of FIG. 6, or other processes as described herein. A scheduler 246 may schedule UEs for data transmission on the downlink, the uplink, or a combination thereof.

The UE 120 may include means for performing one or more operations described herein, such as the process 400 of FIG. 4 or other processes as described herein. In some aspects, such means may include one or more components of UE 120 described in connection with FIG. 2. The base station 110 may include means for performing one or more operations described herein, such as the process 500 of FIG. 5 or other processes as described herein. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
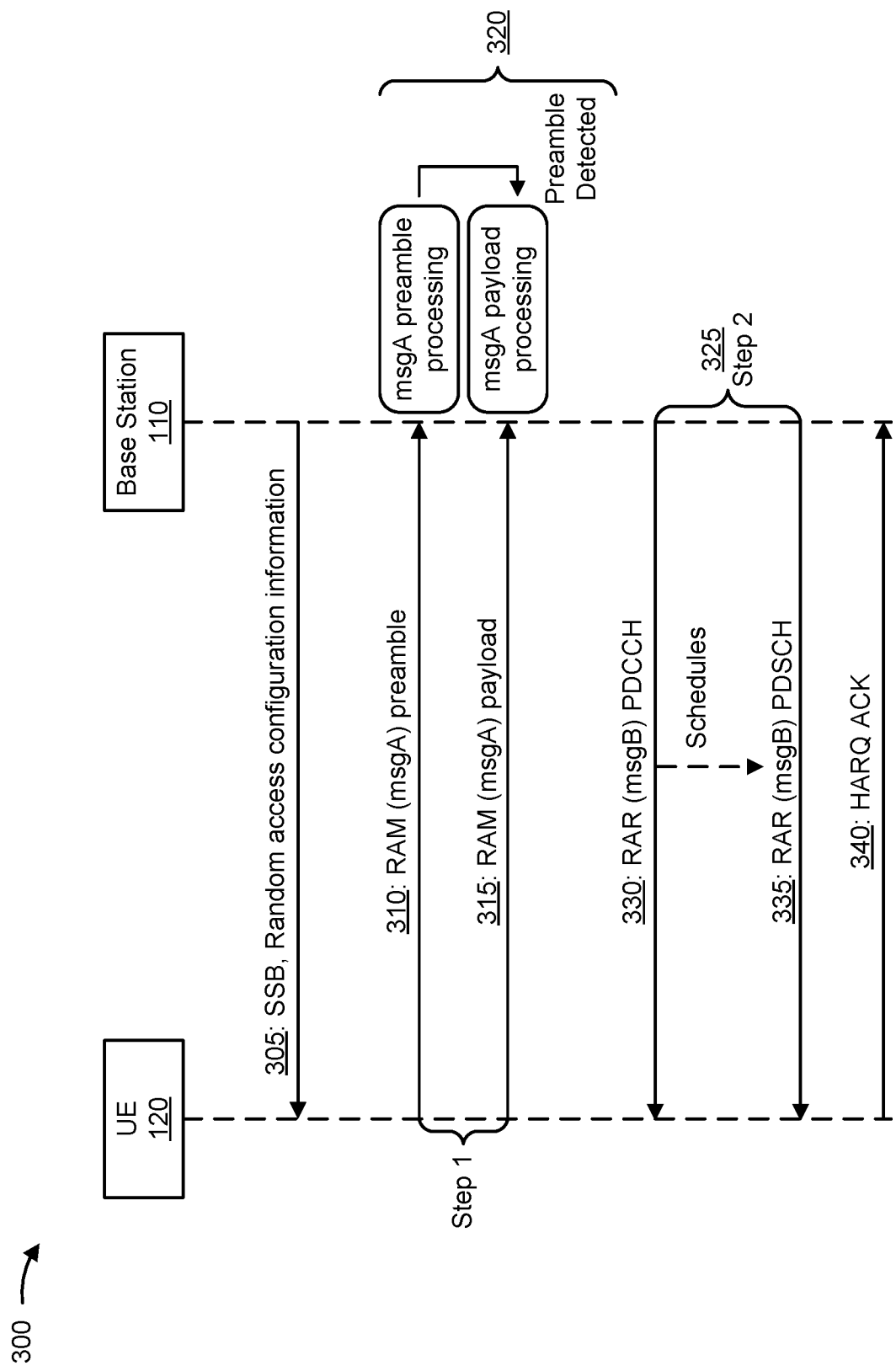
FIG. 3 is a diagram illustrating an example of a two-step random access procedure.

FIG. 3 is a diagram illustrating an example 300 of a two-step random access procedure, in accordance with various aspects of the present disclosure. As shown in FIG. 3, a base station 110 and a UE 120 may communicate with one another to perform the two-step random access procedure.

As shown by reference number 305, the base station 110 may transmit, and the UE 120 may receive, one or more synchronization signal blocks (SSBs) and random access configuration information. In some aspects, the random access configuration information may be transmitted in or indicated by system information (such as in one or more system information blocks (SIBs)) or an SSB, such as for contention-based random access. Additionally, or alternatively, the random access configuration information may be transmitted in a radio resource control (RRC) message or a physical downlink control channel (PDCCH) order message that triggers a RACH procedure, such as for contention-free random access. The random access configuration information may include one or more parameters to be used in the two-step random access procedure, such as one or more parameters for transmitting a random access message (illustrated as "RAM"), receiving a random access response (RAR) to the random access message, or the like. In some aspects, the SSB may identify a time-frequency resource associated with a plurality of RACH occasions.

As shown by reference number 310, the UE 120 may transmit, and the base station 110 may receive, a random access message preamble. As shown by reference number 315, the UE 120 may transmit, and the base station 110 may receive, a random access message payload. As shown, the UE 120 may transmit the random access message preamble and the random access message payload to the base station 110 as part of an initial (or first) step of the two-step random access procedure. In some aspects, the random access message may be referred to as message A, msgA, a first message, or an initial message, in a two-step random access procedure. Furthermore, in some aspects, the random access message preamble may be referred to as a message A preamble, a msgA preamble, a preamble, or a physical random access channel (PRACH) preamble, and the random access message payload may be referred to as a message A payload, a msgA payload, or a payload. In some aspects, the random access message may include some or all of the contents of message 1 (msg1) and message 3 (msg3) of a four-step random access procedure. For example, the random access message preamble may include some or all contents of message 1 (such as a PRACH preamble), and the random access message payload may include some or all contents of message 3 (such as a UE identifier, uplink control information (UCI), a physical uplink shared channel (PUSCH) transmission, or other information). The random access message preamble and payload may be transmitted on a selected RACH occasion, of a set of at least partially overlapping RACH occasions associated with the time-frequency resource identified by the SSB.

As shown by reference number 320, the base station 110 may receive the random access message preamble transmitted by the UE 120. If the base station 110 successfully receives and decodes the random access message preamble, the base station 110 may then receive and decode the random access message payload.

As shown by reference number 325, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, or contention resolution information.

As shown by reference number 330, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (such as in downlink control information (DCI)) for the PDSCH communication.

As shown by reference number 335, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARD) acknowledgement (ACK).

FIG. 4 is a diagram illustrating an example 400 of a random access procedure using random access channel (RACH) occasions that are associated with a same time-frequency resource allocation. As shown, the example 400 includes a UE 120 and a BS 110. The BS 110 may provide access to a network. For example, the BS 110 may provide access to a network on a band or sub-band associated with an occupied channel bandwidth (OCB) threshold, such as an NR-U band or sub-band, or the like. In some aspects, the band or sub-band may be a wideband, such as a 20 MHz sub-band.

The BS 110 may provide configuration information 410 to the UE 120. As further shown, the configuration information 410 may identify a time-frequency (TF) resource allocation 420 (i.e., TF Alloc. 1) for a set of RACH occasions (RACH Occasions 1, 2, and 3, shown by reference number 430). In some aspects, the configuration information 410 may be provided as radio resource control (RRC) information, downlink control information (DCI), a system information block (SIB), a master information block (MIB), or the like.

As shown, the configuration information 410 may identify a TF resource allocation 420 associated with a set of RACH occasions 430. For example, each RACH occasion of the set of RACH occasions 430 may use the TF resource allocation 420. Thus, the set of RACH occasions 430 may overlap in time and in frequency. Each RACH occasion, of the set of RACH occasions 430, may be associated with a different set of sequences. For example, a RACH preamble may be generated in accordance with a sequence, and a BS 110 may respond to the RACH preamble based on the sequence and using resources corresponding to a RACH occasion associated with the sequence. By assigning each RACH occasion a different set of sequences, such as preamble sequence sets, the RACH occasions may be differentiated from each other even though the RACH occasions overlap each other in time and in frequency. Thus, a longer RACH preamble, that satisfies the OCB threshold of the band on which the RACH preamble is transmitted, may be used without sacrificing random access capacity.

In some aspects, the TF resource allocation 420 may be for a legacy RACH occasion. In such a case, a set of virtual RACH occasions may be mapped to the TF resource allocation 420 of the legacy RACH allocation. In other words, a set of virtual RACH occasions (such as the set of RACH occasions 430) may be associated with a legacy RACH occasion and may overlap each other within the legacy RACH occasion's TF resource allocation 420. Legacy RACH occasions may be associated with a same set of sequences and different time resources or different frequency resources, and virtual RACH occasions associated with a particular legacy RACH occasion may be differentiated by the different sets of sequences assigned to the virtual RACH occasions. In this case, the configuration information 410 may identify the TF resource allocation 420 directly (in terms of time and frequency resources) or as a function of the legacy RACH occasion (by identifying the legacy RACH occasion and the sequences of each virtual RACH occasion that is to use the TF resource allocation 420 of the legacy RACH occasion).

The TF resource allocation 420 may be associated with any integer number of RACH occasions, such as one RACH occasion, two RACH occasions, three RACH occasions, four RACH occasions, eight RACH occasions, and so on. In some aspects, the configuration information 410 may indicate how many RACH occasions are associated with a TF resource allocation 420, such as with an indicator of a number of RACH occasions included in the set of RACH occasions 430, or by providing configuration information for each RACH occasion of the set of RACH occasions 430.

The BS 110 (and alternatively the UE 120) may determine a preamble sequence that is included in a RACH occasion. For example, there may be X RACH occasions per TF resource allocation 420 (or in other words, X virtual RACH occasions per legacy RACH occasion). In this case, and assuming 64 sequences per RACH occasion, there may be 64×X sequences for the TF resource allocation 420. Each RACH occasion may be associated with a set of roots. The set of roots may be identified by a table that indicates the set of roots and an order in which roots of the set of roots are to be used. In some aspects, the table may indicate that the roots are to be used in an ascending order ([1 2 3 4 5 . . . ]). In some aspects, the table may indicate that the roots are to be used in a descending order (for example, when the RACH occasion includes 607 symbols, then the table may include [606 605 604 603 . . . ]). In some aspects, the table may indicate that the roots are to alternate between ascending values and descending values (for example, when the RACH occasion includes 607 symbols, then the table may include [1 606 2 605 3 604 4 603 . . . ]). Other forms may be used for the table, and the implementations described herein are not limited to any particular arrangement of the table. The BS 110 may start at a first root of the set of roots and may select up to 64 preamble sequences using a configured cyclic shift step size until all allowed cyclic shift values are used. If the cyclic shift values are exhausted for the first root, the BS 110 may move to a next root, and may select preamble sequences until all the cyclic shift values are used for this root. This may continue until 64 preamble sequences have been selected for the RACH occasion.

In some aspects, the starting root may be implicitly derived for a RACH occasion. As a first option, if a first RACH occasion is completed partway through a particular root, then a second RACH occasion may begin with the next sequence using the current root where the first RACH occasion was completed. As a second option, if a first RACH occasion is completed partway through a particular root, then a second RACH occasion may begin at the beginning of a next root. In some aspects, the starting root may be explicitly configured for each RACH occasion, which may provide increased flexibility of configuration of starting roots. For an example of implicit derivation using the first option and the second option, refer to FIG. 8.

As shown by reference number 440, the BS 110 may transmit a synchronization signal block (SSB) to the UE 120. The SSB may include information related to the TF resource allocation 420. For example, the SSB may identify time and frequency resources of the TF resource allocation 420, or may identify a legacy RACH occasion associated with the TF resource allocation 420.

As shown by reference number 450, the UE 120 may select a RACH occasion of the set of RACH occasions 430 associated with the TF resource allocation 420. In some aspects, the UE 120 may select the RACH occasion randomly. In some aspects, the UE 120 may select the RACH occasion pseudo-randomly. In some aspects, the UE 120 may select the RACH occasion based on a value associated with the UE.

As shown by reference number 460, the UE 120 may transmit a RACH preamble, of the selected RACH occasion, on the TF resource allocation 420. For example, the UE 120 may generate a RACH preamble of the selected RACH occasion in accordance with the configuration information and using one or more of the procedures for determining a preamble sequence described above. The techniques described herein can be applied for a two-step RACH procedure (where the UE 120's RACH message includes a preamble and a payload, as shown in FIG. 3) or for a four-step RACH procedure (where the UE 120's RACH message includes only a preamble). Thus, the UE 120 may perform random access using a preamble associated with a selected RACH occasion, of multiple RACH occasions associated with a particular TF resource allocation.

Figure 5:
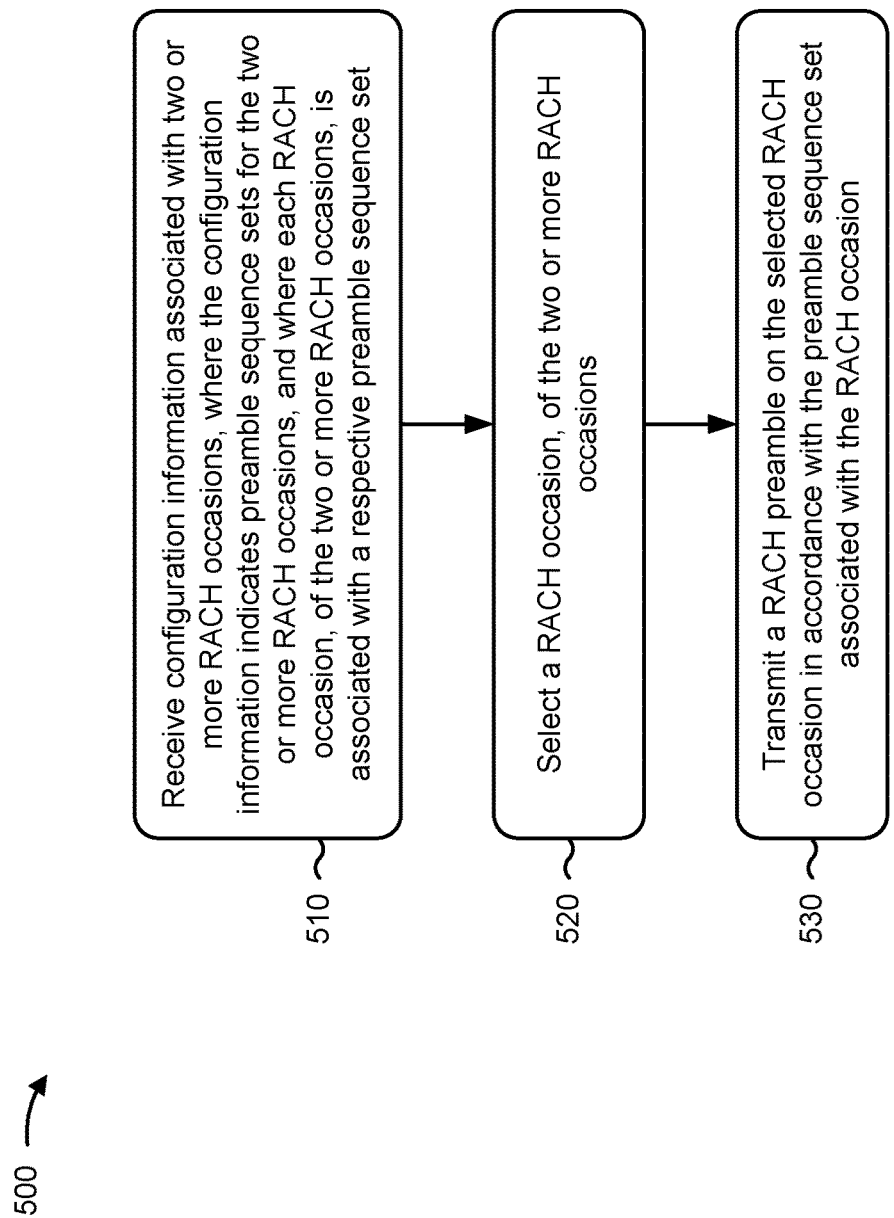
FIG. 5 is a diagram illustrating an example process performed, for example, by a user equipment (UE).

FIG. 5 is a diagram illustrating an example process 500 performed, for example, by a user equipment. The process 500 shows where a UE (such as user equipment 120 or the like) performs operations associated with a random access procedure using random access channel occasions that are associated with a same time-frequency resource allocation.

As shown in FIG. 5, in some aspects, the process 500 may include receiving configuration information associated with two or more RACH occasions, where the configuration information indicates preamble sequence sets for the two or more RACH occasions, and where each of the two or more RACH occasions is associated with a respective preamble sequence set (block 510). For example, the UE (using antenna 252, DEMOD 254, MIMO detector 256, receive processor 258, controller/processor 280, or the like) may receive configuration information associated with two or more RACH occasions, as described above. In some aspects, the configuration information indicates preamble sequence sets for the two or more RACH occasions. In some aspects, each of the two or more RACH occasions is associated with a respective preamble sequence set. In some aspects, a first interface of the UE may receive configuration information associated with two or more RACH occasions.

As shown in FIG. 5, in some aspects, the process 500 may include selecting a RACH occasion, of the two or more RACH occasions (block 520). For example, the UE (using controller/processor 280, transmit processor 264, TX MIMO processor 266, MOD 254, antenna 252, or the like) may select a RACH occasion, of the two or more RACH occasions, as described above. In some aspects, a processing system of the UE may select a RACH occasion, of the two or more RACH occasions.

As shown in FIG. 5, in some aspects, the process 500 may include transmitting a RACH preamble on the selected RACH occasion in accordance with the preamble sequence associated with the RACH occasion (block 530). For example, the UE (using controller/processor 280, transmit processor 264, TX MIMO processor 266, MOD 254, antenna 252, a second interface or the like) may transmit or output, for transmission, a RACH preamble on the selected RACH occasion in accordance with a preamble sequence, of the preamble sequence sets, associated with the selected RACH occasion, as described above. In some aspects, a second interface of the UE may output a RACH preamble for transmission on the selected RACH occasion in accordance with a preamble sequence, of the preamble sequence sets, associated with the selected RACH occasion.

The process 500 may include additional aspects, such as any single aspect or any combination of aspects described below or in connection with one or more other processes described elsewhere herein.

In a first aspect, the RACH preamble occupies a threshold channel bandwidth of a channel in accordance with an occupied channel bandwidth requirement of the UE.

In a second aspect, alone or in combination with the first aspect, each RACH occasion of the two or more RACH occasions is associated with a same time-frequency resource allocation.

In a third aspect, alone or in combination with one or more of the first and second aspects, the two or more RACH occasions are associated with respective time-frequency resource allocations.

In a fourth aspect, alone or in combination with one or more of the first through third aspects, the UE (such as a fourth interface of the UE) may receive an SSB that identifies a particular time-frequency resource allocation of the respective time-frequency resource allocations, where transmitting the RACH preamble on the selected RACH occasion is based on the selected RACH occasion being associated with the particular time-frequency resource allocation.

In a fifth aspect, alone or in combination with one or more of the first through fourth aspects, the configuration information identifies a first preamble sequence set for a first RACH occasion of the two or more RACH occasions, where preamble sequence sets for one or more other RACH occasions, of the two or more RACH occasions, are derived based on the first preamble sequence set.

In a sixth aspect, alone or in combination with one or more of the first through fifth aspects, the configuration information identifies a first preamble sequence set for a first RACH occasion of the two or more RACH occasions, where a second preamble sequence set for a second RACH occasion of the two or more RACH occasions starts at a last-used root and a next sequence after a last-used sequence of the first preamble sequence set.

In a seventh aspect, alone or in combination with one or more of the first through sixth aspects, the configuration information identifies a first preamble sequence set for a first RACH occasion, of the two or more RACH occasions, where a second preamble sequence set for a second RACH occasion of the two or more RACH occasions starts at a next root after a last-used root of the first preamble sequence set.

In an eighth aspect, alone or in combination with one or more of the first through seventh aspects, the configuration information identifies respective root sequences for the respective preamble sequence sets.

In a ninth aspect, alone or in combination with one or more of the first through eighth aspects, the configuration information indicates a number of RACH occasions associated with a particular time-frequency resource allocation.

Although FIG. 5 shows example blocks of the process 500, in some aspects, the process 500 may include additional blocks, fewer blocks, different blocks, or differently arranged blocks than those depicted in FIG. 5. Additionally, or alternatively, two or more of the blocks of the process 500 may be performed in parallel.

Figure 6:
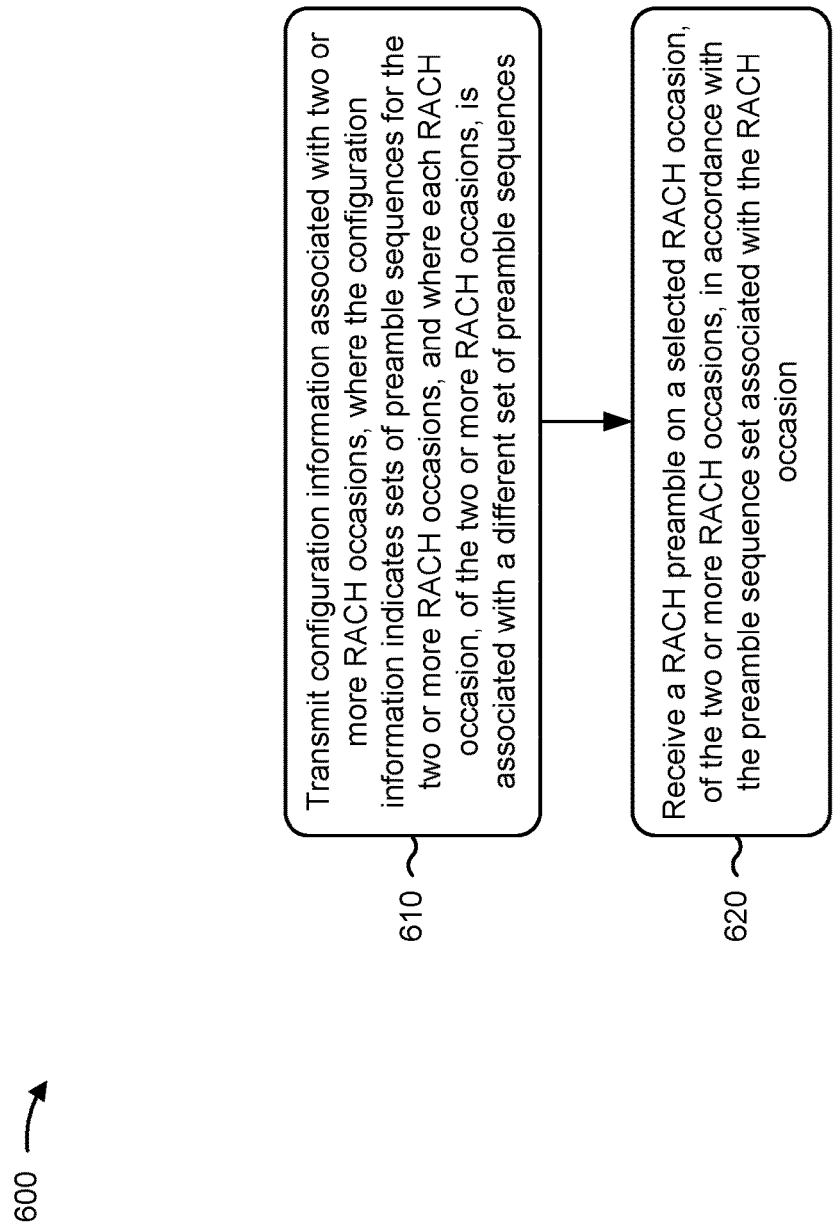
FIG. 6 is a diagram illustrating an example process performed, for example, by a base station (BS).

FIG. 6 is a diagram illustrating an example process 600 performed, for example, by a base station. The process 600 shows where a base station (such as base station 110 or the like) performs operations associated with a random access procedure using random access channel occasions that are associated with a same time-frequency resource allocation.

As shown in FIG. 6, in some aspects, the process 600 may include transmitting configuration information associated with two or more RACH occasions, where the configuration information indicates preamble sequence sets for the two or more RACH occasions, and where each of the two or more RACH occasions is associated with a respective preamble sequence set (block 610). For example, the base station (using controller/processor 240, transmit processor 220, TX MIMO processor 230, MOD 232, antenna 234, or the like) may transmit configuration information associated with two or more RACH occasions, as described above. In some aspects, the configuration information indicates preamble sequence sets for the two or more RACH occasions. In some aspects, each of the two or more RACH occasions is associated with a respective preamble sequence set. In some aspects, a first interface of the base station may transmit configuration information associated with two or more RACH occasions.

As shown in FIG. 6, in some aspects, the process 600 may include receiving a RACH preamble on a selected RACH occasion, of the two or more RACH occasions, in accordance with the preamble sequence associated with the RACH occasion (block 620). For example, the base station (using antenna 234, DEMOD 232, MIMO detector 236, receive processor 238, controller/processor 240, or the like) may receive a RACH preamble on a selected RACH occasion, of the two or more RACH occasions, in accordance with a preamble sequence, of the preamble sequence sets, associated with the selected RACH occasion, as described above. In some aspects, a second interface of the base station may receive a RACH preamble on a selected RACH occasion, of the two or more RACH occasions, in accordance with a preamble sequence, of the respective preamble sequence sets, associated with the selected RACH occasion.

The process 600 may include additional aspects, such as any single aspect or any combination of aspects described below or in connection with one or more other processes described elsewhere herein.

In a first aspect, the RACH preamble occupies a threshold channel bandwidth of a channel in accordance with an occupied channel bandwidth requirement of the UE.

In a second aspect, alone or in combination with the first aspect, the two or more RACH occasions are associated with respective time-frequency resource allocations.

In a third aspect, alone or in combination with one or more of the first and second aspects, the base station (such as the first interface of the base station) may transmit or output for transmission a synchronization signal block that identifies a particular time-frequency resource allocation of the respective time-frequency resource allocations, where receiving the RACH preamble on the selected RACH occasion is based on the selected RACH occasion being associated with the particular time-frequency resource allocation.

In a fourth aspect, alone or in combination with one or more of the first through third aspects, the configuration information identifies a first preamble sequence set for a first RACH occasion of the two or more RACH occasions, where preamble sequence sets for one or more other RACH occasions, of the two or more RACH occasions, are derived based on the first preamble sequence set.

In a fifth aspect, alone or in combination with one or more of the first through fourth aspects, the configuration information identifies a first preamble sequence set for a first RACH occasion of the two or more RACH occasions, where a second preamble sequence set for a second RACH occasion of the two or more RACH occasions starts at a last-used root and a next sequence after a last-used sequence of the first preamble sequence set.

In a sixth aspect, alone or in combination with one or more of the first through fifth aspects, the configuration information identifies a first preamble sequence set for a first RACH occasion, of the two or more RACH occasions, where a second preamble sequence set for a second RACH occasion of the two or more RACH occasions starts at a next root after a last-used root of the first preamble sequence set.

In a seventh aspect, alone or in combination with one or more of the first through sixth aspects, the configuration information identifies respective root sequences for the respective preamble sequence sets.

In an eighth aspect, alone or in combination with one or more of the first through seventh aspects, the configuration information indicates a number of RACH occasions associated with a particular time-frequency resource allocation.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

Figure 7:
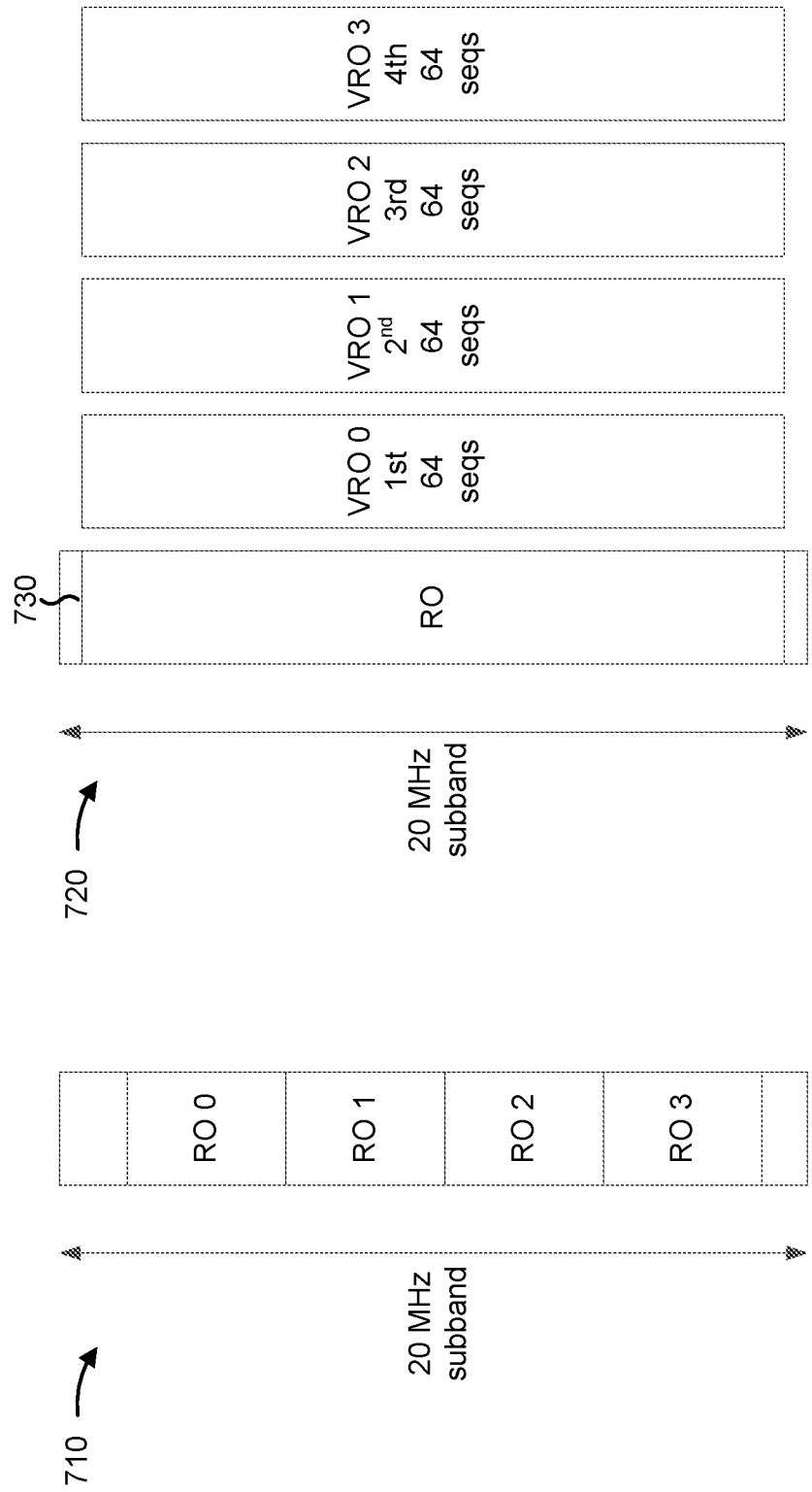
FIG. 7 is a diagram illustrating an example of frequency division multiplexed RACH occasions and a set of virtual RACH occasions associated with a same time-frequency resource or a same RACH occasion.

FIG. 7 is a diagram illustrating an example of frequency division multiplexed RACH occasions (shown by reference number 710) and a set of virtual RACH occasions associated with a same time-frequency resource or a same RACH occasion (shown by reference number 720). In the frequency division multiplexed case, four RACH occasions (RO0 through RO3) are multiplexed on a 20 MHz subband. The set of RACH occasions shown by reference number 720 may each be associated with the same time-frequency resource, shown by reference number 730, and may each occupy approximately 20 MHz. Thus, each RACH occasion may satisfy OCB requirements of an unlicensed band while increasing the random access capacity of such an unlicensed band. The time-frequency resource is described in more detail in connection with the TF resource allocation 420 of FIG. 4, and the four virtual RACH occasions are described in more detail in connection with the set of RACH occasions 430 of FIG. 4.

As further shown, the set of virtual RACH occasions may be associated with respective preamble sequence sets, such as respective sets of 64 preamble sequences. For example, a first virtual RACH occasion (VRO 0) is associated with a first 64 preamble sequences, a second virtual RACH occasion (VRO 1) is associated with a second 64 preamble sequences, a third virtual RACH occasion (VRO 2) is associated with a third 64 preamble sequences, and a fourth virtual RACH occasion (VRO 3) is associated with a fourth 64 preamble sequences. These preamble sequence sets may be computed using implicit root sequences, as described in connection with FIG. 4.

A UE may receive random access configuration information that indicates one or more parameters, such as the time-frequency resource shown by reference number 730, the set of virtual RACH occasions shown by reference number 720, and the corresponding preamble sequence sets of each virtual RACH occasion. The UE may transmit a random access message preamble on a virtual RACH occasion, and may use a preamble sequence corresponding to the virtual RACH occasion to generate the random access message preamble. For example, if the UE selects VRO 2, then the UE may use a preamble sequence of the third 64 preamble sequences associated with VRO 2. The UE also may transmit a random access message payload in association with the random access message preamble.

Figure 8:
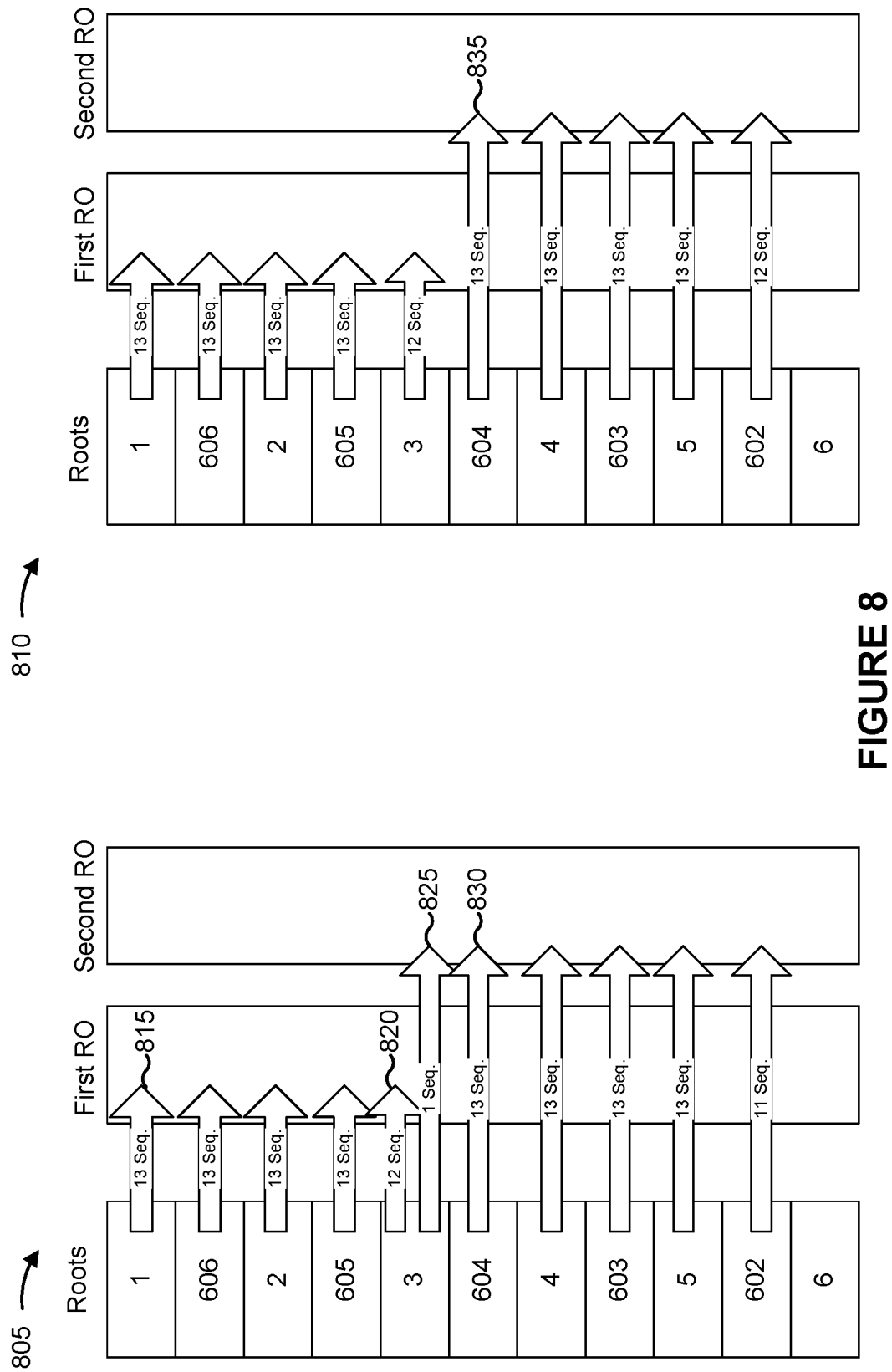
FIG. 8 is a diagram illustrating examples of implicit derivation of preamble sequences.

FIG. 8 is a diagram illustrating examples of implicit derivation of preamble sequences. Reference number 805 shows implicit derivation of preamble sequences using a first option in which all sequences of a given root are used before moving to a next root, and reference number 810 shows implicit derivation of preamble sequences using a second option in which each RACH occasion starts with a different root. In FIG. 8, a RACH occasion is associated with a length of 607 symbols, a cyclic shift step size of 46, 64 preamble sequences, and a root table indicating roots [1 606 2 605 3 604 . . . ]. In this case, each root can create 13 sequences (determined as the floor of 607/46).

As shown by reference number 815, in the first option, the BS 110 may generate 52 sequences using roots [1 606 2 605] (13 sequences from each root). As shown by reference number 820, the BS 110 may generate 12 sequences using root 3 to finish the preamble sequences of a first RACH occasion. As shown by reference number 825, the BS 110 may start with the 13$^{th}$ sequence from root 3 to determine sequences for a second RACH occasion. As shown by reference number 830, the BS 110 may proceed to use all sequences of roots [604 4 603 5] and a first 11 sequences of root 602 to generate the total of 64 preamble sequences for the second RACH occasion.

In the second option shown by reference number 810, the generation of sequences for the first RO is similar to what is described with regard to the first option. However, as shown by reference number 835, to generate sequences for the second RO, the BS 110 may start with a first sequence of root 604, may use all sequences of roots [604 4 603 5], and may use a first 12 sequences of root 602.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
receiving configuration information associated with two or more overlapping random access channel (RACH) occasions,
wherein the configuration information indicates preamble sequence sets for the two or more overlapping RACH occasions,
wherein each of the two or more overlapping RACH occasions is associated with a respective preamble sequence set, and
wherein the two or more overlapping RACH occasions overlap in time and frequency;
selecting a RACH occasion, of the two or more overlapping RACH occasions; and
transmitting a RACH preamble on the selected RACH occasion in accordance with the respective preamble sequence set associated with the selected RACH occasion.

2. The method of claim 1, wherein the RACH preamble occupies a threshold channel bandwidth of a channel in accordance with an occupied channel bandwidth requirement of the UE.

3. The method of claim 1, further comprising:
receiving a synchronization signal block (SSB) that identifies a particular time-frequency resource allocation,
wherein transmitting the RACH preamble on the selected RACH occasion is based at least in part on the selected RACH occasion being associated with the particular time-frequency resource allocation.

4. The method of claim 1, wherein the configuration information identifies a first preamble sequence set for a first RACH occasion of the two or more overlapping RACH occasions, and wherein preamble sequence sets for one or more other RACH occasions, of the two or more overlapping RACH occasions, are derived based at least in part on the first preamble sequence set.

5. The method of claim 1, wherein the configuration information identifies a first preamble sequence set for a first RACH occasion of the two or more overlapping RACH occasions, and wherein a second preamble sequence set for a second RACH occasion of the two or more overlapping RACH occasions starts at a last-used root and a next sequence after a last-used sequence of the first preamble sequence set.

6. The method of claim 1, wherein the configuration information identifies a first preamble sequence set for a first RACH occasion, of the two or more overlapping RACH occasions, and wherein a second preamble sequence set for a second RACH occasion of the two or more overlapping RACH occasions starts at a next root after a last-used root of the first preamble sequence set.

7. The method of claim 1, wherein the configuration information identifies respective root sequences for the preamble sequence sets.

8. The method of claim 1, wherein the configuration information indicates a number of RACH occasions associated with a particular time-frequency resource allocation.

9. A method of wireless communication performed by an apparatus of a network entity, comprising:
transmitting configuration information associated with two or more overlapping random access channel (RACH) occasions,
wherein the configuration information indicates preamble sequence sets for the two or more overlapping RACH occasions,
wherein each of the two or more overlapping RACH occasions is associated with a respective preamble sequence set, and
wherein the two or more overlapping RACH occasions overlap in time and frequency; and receiving a RACH preamble on a selected RACH occasion, of the two or more overlapping RACH occasions, in accordance with the respective preamble sequence set associated with the selected RACH occasion.

10. The method of claim 9, wherein the RACH preamble occupies a threshold channel bandwidth of a channel in accordance with an occupied channel bandwidth requirement.

11. The method of claim 9, further comprising:
transmitting a synchronization signal block (SSB) that identifies a particular time-frequency resource allocation,
wherein receiving the RACH preamble on the selected RACH occasion is based at least in part on the selected RACH occasion being associated with the particular time-frequency resource allocation.

12. The method of claim 9, wherein the configuration information identifies a first preamble sequence set for a first RACH occasion of the two or more overlapping RACH occasions, and wherein preamble sequence sets for one or more other RACH occasions, of the two or more overlapping RACH occasions, are derived based at least in part on the first preamble sequence set.

13. The method of claim 9, wherein the configuration information identifies a first preamble sequence set for a first RACH occasion of the two or more overlapping RACH occasions, and wherein a second preamble sequence set for a second RACH occasion of the two or more overlapping RACH occasions starts at a last-used root and a next sequence after a last-used sequence of the first preamble sequence set.

14. The method of claim 9, wherein the configuration information identifies a first preamble sequence set for a first RACH occasion, of the two or more overlapping RACH occasions, and wherein a second preamble sequence set for a second RACH occasion of the two or more overlapping RACH occasions starts at a next root after a last-used root of the first preamble sequence set.

15. The method of claim 9, wherein the configuration information identifies respective root sequences for the preamble sequence sets.

16. The method of claim 9, wherein the configuration information indicates a number of RACH occasions associated with a particular time-frequency resource allocation.

17. An apparatus of a user equipment (UE) for wireless communication, comprising:
a first interface configured to obtain configuration information associated with two or more overlapping random access channel (RACH) occasions,
wherein the configuration information indicates preamble sequence sets for the two or more overlapping RACH occasions,
wherein each of the two or more overlapping RACH occasions is associated with a respective preamble sequence set, and
wherein the two or more overlapping RACH occasions overlap in time and frequency;
a processing system configured to select a RACH occasion, of the two or more overlapping RACH occasions; and
a second interface configured to output a RACH preamble for transmission on the selected RACH occasion in accordance with the respective preamble sequence set associated with the selected RACH occasion.

18. The apparatus of claim 17, wherein the RACH preamble occupies a threshold channel bandwidth of a channel in accordance with an occupied channel bandwidth requirement of the UE.

19. The apparatus of claim 17, wherein the configuration information identifies a first preamble sequence set for a first RACH occasion of the two or more overlapping RACH occasions, and
wherein preamble sequence sets for one or more other RACH occasions, of the two or more overlapping RACH occasions, are derived based at least in part on the first preamble sequence set.

20. The apparatus of claim 17, wherein the configuration information identifies a first preamble sequence set for a first RACH occasion of the two or more overlapping RACH occasions, and
wherein a second preamble sequence set for a second RACH occasion of the two or more overlapping RACH occasions starts at a last-used root and a next sequence after a last-used sequence of the first preamble sequence set.

21. The apparatus of claim 17, wherein the configuration information identifies a first preamble sequence set for a first RACH occasion, of the two or more overlapping RACH occasions, and
wherein a second preamble sequence set for a second RACH occasion of the two or more overlapping RACH occasions starts at a next root after a last-used root of the first preamble sequence set.

22. The apparatus of claim 17, wherein the configuration information identifies respective root sequences for the preamble sequence sets.

23. The apparatus of claim 17, wherein the configuration information indicates a number of RACH occasions associated with a particular time-frequency resource allocation.

24. The apparatus of claim 17, wherein the first interface is further configured to:
receive a synchronization signal block (SSB) that identifies a particular time-frequency resource allocation,
wherein outputting the RACH preamble on the selected RACH occasion is based at least in part on the selected RACH occasion being associated with the particular time-frequency resource allocation.

25. An apparatus of a network entity for wireless communication, comprising:
a first interface configured to output configuration information associated with two or more overlapping random access channel (RACH) occasions,
wherein the configuration information indicates preamble sequence sets for the two or more overlapping RACH occasions,
wherein each of the two or more overlapping RACH occasions is associated with a respective preamble sequence set, and
wherein the two or more overlapping RACH occasions overlap in time and frequency; and
a second interface configured to obtain a RACH preamble on a selected RACH occasion, of the two or more overlapping RACH occasions, in accordance with the respective preamble sequence set associated with the selected RACH occasion.

26. The apparatus of claim 25, wherein the RACH preamble occupies a threshold channel bandwidth of a channel in accordance with an occupied channel bandwidth requirement.

27. The apparatus of claim 25, wherein the first interface is further configured to:

transmit a synchronization signal block (SSB) that identifies a particular time-frequency resource allocation,
wherein obtaining the RACH preamble on the selected RACH occasion is based at least in part on the selected RACH occasion being associated with the particular time-frequency resource allocation.

28. The apparatus of claim 25, wherein the configuration information identifies a first preamble sequence set for a first RACH occasion of the two or more overlapping RACH occasions, and wherein preamble sequence sets for one or more other RACH occasions, of the two or more overlapping RACH occasions, are derived based at least in part on the first preamble sequence set.

29. The apparatus of claim 25, wherein the configuration information identifies a first preamble sequence set for a first RACH occasion of the two or more overlapping RACH occasions, and wherein a second preamble sequence set for a second RACH occasion of the two or more overlapping RACH occasions starts at a last-used root and a next sequence after a last-used sequence of the first preamble sequence set.

30. The apparatus of claim 25, wherein the configuration information identifies a first preamble sequence set for a first RACH occasion, of the two or more overlapping RACH occasions, and wherein a second preamble sequence set for a second RACH occasion of the two or more overlapping RACH occasions starts at a next root after a last-used root of the first preamble sequence set.

\* \* \* \* \*